US006377808B1

(12) United States Patent
Korneluk et al.

(10) Patent No.: US 6,377,808 B1
(45) Date of Patent: Apr. 23, 2002

(54) METHOD AND APPARATUS FOR ROUTING DATA IN A COMMUNICATION SYSTEM

(75) Inventors: Jose E. Korneluk, Boynton Beach; Todd M. Russell, Coral Springs; Orestes Melgarejo, Pembroke Pines; Alex Wang, Plantation; Alan Wai Chan, Sunrise, all of FL (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/559,451

(22) Filed: Apr. 27, 2000

(51) Int. Cl.[7] .......................... H04Q 7/20; H04M 3/42
(52) U.S. Cl. ...................... 455/445; 455/414; 455/556; 370/392
(58) Field of Search ................................. 370/409, 404, 370/401, 402, 403, 405, 406, 407, 408, 349, 392, 389; 455/414, 415, 556, 557, 550, 445, 466; 709/238, 250; 375/222

(56) References Cited

U.S. PATENT DOCUMENTS 4,730,311 A  *  3/1988  Carse et al. ................ 370/522
5,544,222 A  *  8/1996  Robinson et al. ........... 455/557
5,974,085 A  * 10/1999  Smith .......................... 375/222
6,052,592 A  *  4/2000  Schellinger et al. ........ 455/445

OTHER PUBLICATIONS

McKusick, J.K., Bostic, K., Karels M.J., and Quarterman, J.S., "The Design and Implementation of the 4.4BSD Operating System," Addison–Wesley, Reading, Massachusetts.

* cited by examiner

Primary Examiner—Vivian Chang
Assistant Examiner—Eliseo Ramos-Feliciano
(74) Attorney, Agent, or Firm—Scott M. Garrett (57) ABSTRACT

A controller in a communication device receives a request, from a process operating in the communication device, to subscribe to a data routing service that is managed by the controller. In response to the request, the controller assigns a destination identifier to the process and adds the process and the assigned destination identifier to a routing table that is stored in a memory associated with the controller. Data subsequently received from a data source is routed to the process or to one of multiple communication ports by the controller by reference to the destination identifier, or the absence of a destination identifier, stored in the routing table.

21 Claims, 4 Drawing Sheets

METHOD AND APPARATUS FOR ROUTING DATA IN A COMMUNICATION SYSTEM

BACKGROUND OF THE INVENTION

1. Field of the Invention

The present invention relates to wireless telecommunication systems, and more particularly to the routing of data in a wireless communication device.

2. Description of the Prior Art

The development of digital versions of analog mobile and portable communication devices, such as cellular telephones and radiotelephones, has opened up new avenues for potential use of such devices. While the analog mobile communication devices merely provided verbal communication services for an end user such as an individual, the development of the digital versions have resulted in an opportunity to develop communication devices that are multi-functional wireless-transmitters and receivers of digital data. For example, a potential application for such a multi-functional digital communication device (DCD) is the provision of wireless modem-type services for an end user such as a data terminal, such as a fax machine, or a data terminal equipment item (DTE, such as a personal computer or a workstation, that is connected to a data port of the DCD, in addition to the provision of conventional verbal communication services to an individual. In order to provide multi-functional communication services, the DCD must be able to route data to and from each of multiple communication ports, which ports each provide a communication interface for one of multiple DCD end users.

In addition, the development of a DCD that can transmit and receive data has opened up an opportunity for a DCD to run applications that were not available for analog communication devices. For example, an individual using a DCD may be able to run a web browsing application that links to, and exchanges data with, web-based servers via the Internet.

In order for a DCD to provide wireless communication services to each of multiple communication ports, wherein the multiple communication ports are capable of interfacing with multiple potential end users, and to further provide communication services to each of multiple applications that may be run on the DCD, the DCD must have a method for determining a destination of data received by the DCD and for routing the data accordingly.

Therefore, a need exists for a method and apparatus for routing multiple data streams among multiple applications and among multiple communication ports of a DCD.

DESCRIPTION OF THE PREFERRED EMBODIMENT

To address the need for a method and apparatus for routing multiple data streams among multiple applications and among multiple communication ports of a digital communication device, a method and apparatus is provided for routing data in the communication device. A controller in the communication device receives a request, from a process operating in the communication device, to subscribe to a data routing service that is managed by the controller. In response to the request, the controller assigns a destination identifier to the process and adds the process and the assigned destination identifier to a routing table that is stored in a memory associated with the controller. Data subsequently received from a data source is routed to the process or to one of multiple communication ports by the controller by reference to the destination identifier, or the absence of a destination identifier, stored in the routing table.

Generally, the present invention provides a method for routing data in a communication device. The method includes steps of receiving a request from a process to subscribe to a data routing service and assigning a destination identifier to the process in response to the request. The method further includes the step of adding the process and the assigned destination identifier to a routing table, wherein data received from a data source is routed to the process by reference to the destination identifier included in the routing table.

Another embodiment of the present invention encompasses an apparatus for routing data in a communication device. The apparatus includes a controller having a data routing task that receives a request from a process to subscribe to a data routing service and that assigns a destination identifier to the process. The controller adds the process and the assigned destination identifier to a routing table, wherein data received from a data source is routed to the process by reference to the destination identifier included in the routing table. The apparatus further includes a memory coupled to the controller that stores the routing table.

Finally, another embodiment of the present invention encompasses a communication device that includes multiple data ports for the transmission and reception of data by the communication device, a controller in communication with each data port of the multiple data ports, and a memory coupled to the controller. The controller includes a data routing task that receives a request from a process to subscribe to a data routing service and assigns a destination identifier to the process. The controller adds the process and the assigned destination identifier to a routing table that is stored in the memory. When data is received from a data source via one of the multiple data ports, the data is routed by the controller to the process by reference to the destination identifier included in the routing table.

Figure 1:
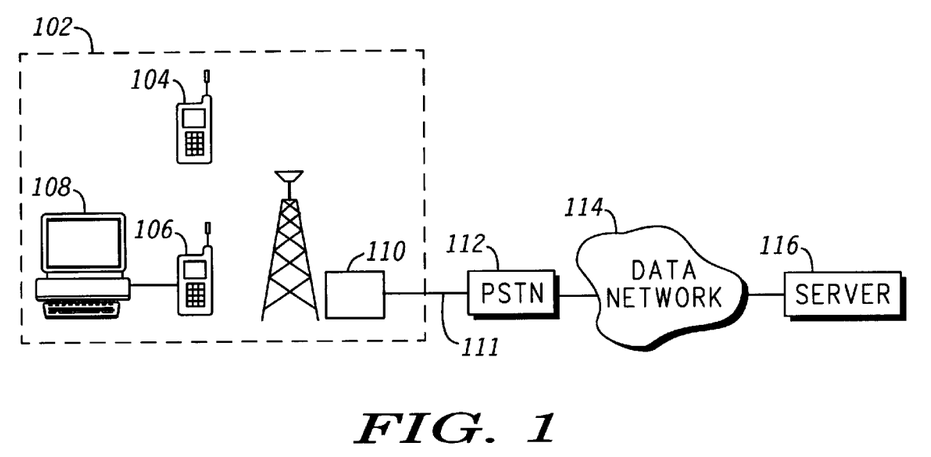
FIG. 1 is a block diagram of a wireless telecommunication system in accordance with a preferred embodiment of the present invention.

The present invention can be more fully understood with reference to FIGS. 1–4. FIG. 1 is a block diagram of a wireless communication system 102 in accordance with a preferred embodiment of the present invention. Communication system 102 includes multiple subscriber units 104, 106 (two shown) and a communication system infrastructure 110, and can be, for example, a cellular system or a two way radio system. Communication system infrastructure 110 is typically connected to a Public Switched Telephone Network (PSTN) 112 through a communication link 111, such as a frame relay link. Communication link 111 allows communication units 104, 106 to communicate over PSTN 112. PSTN 112 is connected to a data network 114, preferably the Internet, and via data network 114 to a web-based server 116.

In the preferred embodiment, an external call initiated from PSTN 112, or from web-based server 116 via data network 114 and PSTN 112, is directed toward a communication device 104, 106. PSTN 112 will send the call notification and source identification information over communication link 111 to communication system 102, where infrastructure 110 will forward the call to an appropriate communication device 104, 106 and reserve a communication channel for communication with the communication device.

In an alternative embodiment of the present invention, a first communication device 104 of the multiple communication devices 104, 106 may make a call to another communication device, such as communication device 106. The call may be directly from communication device 104 to communication device 106, or the call may be facilitated by infrastructure 110. Furthermore, the call may be a private call to a single communication device or the call can be to multiple other communication devices. Communication device 106 receives notification of the call from either infrastructure 110 or communication device 104, and either one of the two participating communication devices 104, 106 or infrastructure 110 may reserve a communication channel for communication between the two devices.

Figure 2:
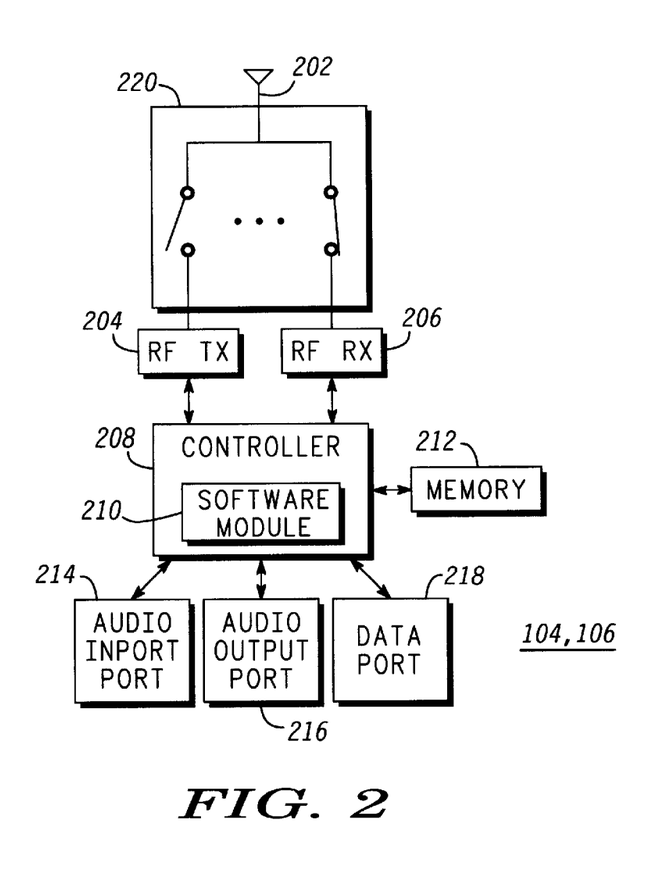
FIG. 2 is a block diagram of a communication device of FIG. 1 in accordance with the preferred embodiment of the present invention.

Each communication device 104, 106 preferably is an "iDEN" radiotelephone that is commercially available from Motorola, Inc. of Schaumburg, Ill., and that is modified to provide for the functionality of the present invention. As shown in FIG. 2, each communication device 104, 106 preferably includes a radio frequency receiver 206 and a radio frequency transmitter 204, both electrically coupled to an antenna 202 via an antenna port 220, preferably an antenna switch, as is common in the art. Receiver 206 and transmitter 204 are each coupled to a controller 208, such as a microprocessor for operating the communication device 104, 106. Controller 208 operates according to a set of instruction codes stored in a memory 212. Controller 208 is further connected to each of multiple input and output ports 214–218. The multiple input and output ports 214–218 preferably include an audio input port 214 and an audio output port 216 that respectively receive an audio signal from, and transmit an audio signal to, an individual end user of the communication device. The multiple input and output ports 214–218 further include a serial data terminal port 218 that transmits data to, and receives data from, an end user such as a fax machine or data terminal equipment (DTE) 108, such as a personal computer or a workstation. Each of ports 214–218 includes electrical circuitry that facilitates the exchange of information between the communication device and an information source.

When information is received by a communication device 104, 106 via one of multiple ports 214–220, the information is demodulated and digitized, if not already in a digital format, and processed by one or more tasks running in a software module 210 embedded in controller 208. The digitized data is then routed by software module 210 to a software application, or process, running in software module 210, or to one of the multiple ports 214–220. To facilitate a processing of the digitized data and a routing of the data to one of multiple potential destinations, such as ports 214–220 or an application running in controller 208, the communication device must have a routing scheme.

At the level of interconnected networks systems, such as the Internet 114, techniques known as protocols have been developed for the exchange of data among multiple users of the networks. The protocols specify the manner of interpreting every data bit of a data packet exchanged across the networks. In order to simplify network designs, several well-known techniques of layering the protocols have been developed. Protocol layering divides the network design into functional layers and then assigns separate protocols to perform each layer's task. By using protocol layering, the protocols are kept simple, each with a few well-defined tasks. The protocols can then be assembled into a useful whole, and individual protocols can be removed or replaced as needed.

A layered representation of protocols is commonly known as a protocol stack. One protocol stack commonly used for the interconnection of network systems is TCP/IP, named for two of the protocols, Transmission Control Protocol (TCP) and Internet Protocol (IP), in the stack. The TCP/IP protocol stack includes four layers, which layers are, from highest to lowest, an application layer, a transport layer, an internetwork layer, and a network interface and hardware layer.

The bottom layer in the TCP/IP protocol stack, that is, the network interface layer, also known as the link layer or data-link layer, provides an interface to network hardware. The next layer up from the network interface layer, that is the internetwork layer, or internet layer or network layer, is responsible for delivering data across a series of different physical networks that interconnect a source of the data and a destination for the data. Routing protocols, such as the IP protocol, are included in the internetwork layer, and a message routed from one IP layer to another IP layer is known as an IP datagram. An IP datagram includes an IP header containing information for the IP protocol and data for the higher level protocols. Included in the IP header is an IP address for each of a source of the datagram and a destination of the datagram. An IP address uniquely identifies an interface that is capable of sending and receiving an IP datagram and is described in detail in Request For Comments (RFC) 1166, a publication of the Internet Engineering Taskforce (IETF).

The next layer up from the internetwork layer is the transport layer. The transport layer provides end-to-end data flow management across interconnected network systems, such as connection rendezvous and flow control. Typically, the transport layer includes one of two transport protocols, TCP and UDP (User Datagram Protocol), that each provides a mechanism for delivering an IP datagram to a specified port. TCP is an Internet standard protocol with a standard (STD) number 7 and is described in detail in RFC 793. UDP is an Internet standard protocol with an STD number 6 and is described in detail in RFC 768. A system using the UDP protocol to deliver an IP datagram includes a UDP address in the datagram, which address includes an IP address and a port number, and a UDP header that further includes a source port number, a destination port number, a length of datagram number, and a checksum. Above the transport layer is the application layer, which layer contains protocols that implement user-level applications, such as file transfer and mail delivery.

The interface between the transport layer and the application layer is defined by ports and sockets. Ports and sockets provide a means by which an application running in an application layer on a host may communicate via the transport layer and an interconnected network system with another application running in an application layer on another host. Alternatively, ports and sockets are used for communication between processes resident within the same host. A port is a number, preferably a 16-bit number, that is used by a transport protocol to identify a higher level protocol or application program (process) to which the transport protocol must deliver an incoming IP datagram. A TCP socket is composed of the port number of the application program (process) and the IP address of the host for the socket, and as such acts as the endpoint of a connection or request for network services. Sockets include socket numbers and an application program (process) can send and receive TCP/IP messages by opening a socket and reading and writing data to and from the particular socket.

The development of multi-functional digital communication devices (DCD's) (e.g., communication devices 104, 106) has created a need for a routing system in a communication device that can properly route multiple data streams among multiple applications running in a DCD and in end users coupled to the DCD. Therefore, the present invention creates a routing task in a DCD that utilizes a transport mechanism developed for an interconnected network system, such as UDP, to properly route received data in the DCD.

Figure 3:
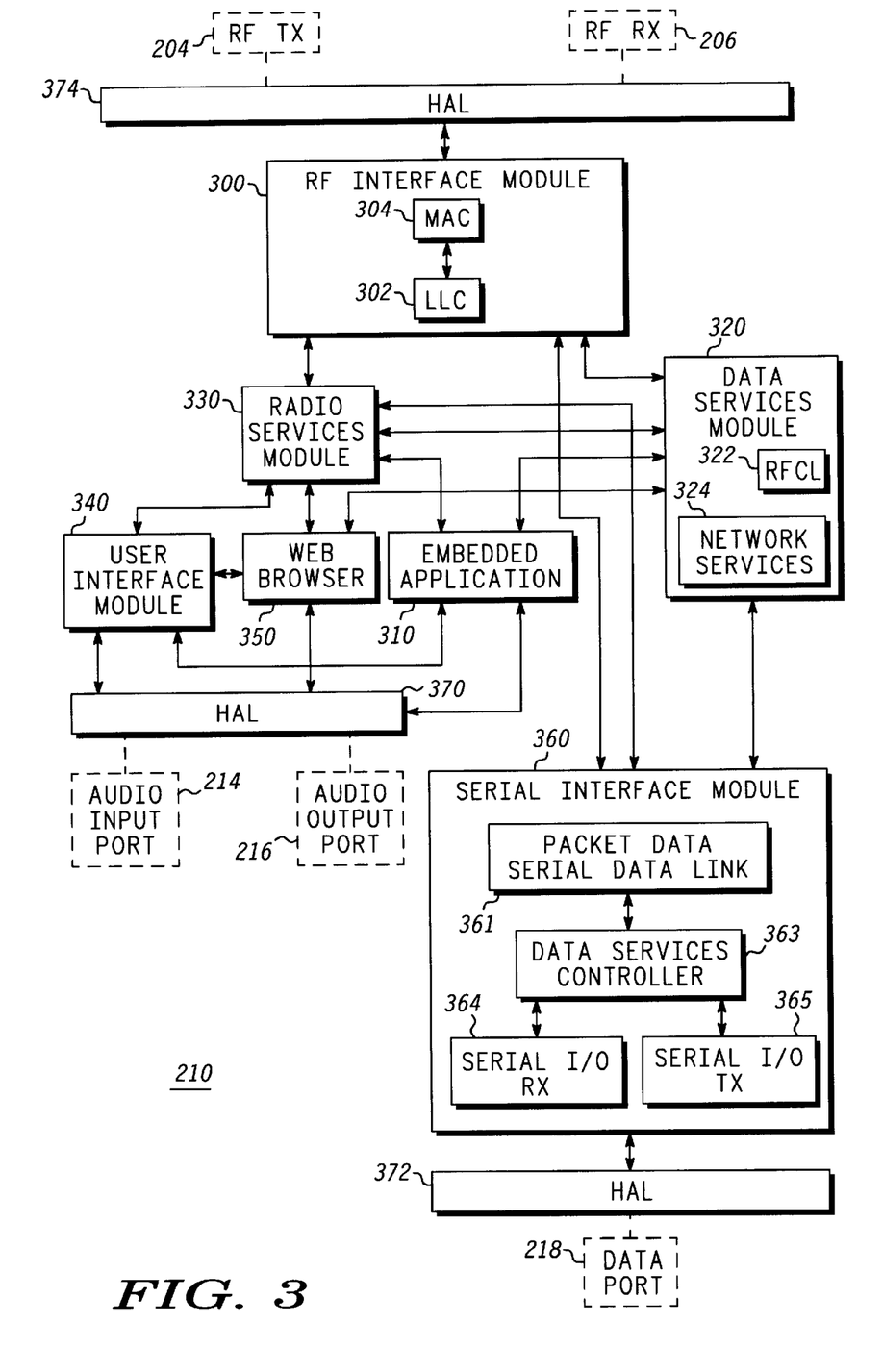
FIG. 3 is a block diagram of a software module the communication device of FIG. 2 in accordance with the preferred embodiment of the present invention.

In the preferred embodiment, the routing task is resident in software module 210. As shown in FIG. 3, software module 210 includes multiple software modules 320–374, wherein each software module performs at least one software task. The task of routing received data, such as IP datagrams, is performed by a network services module, or task, 324 in a data services module 320. Network services module 324 also performs the registration and authentication of a communication device's IP address in system 100 and data encryption and decryption. Data services module 320 further includes a radio frequency conversion layer (RFCL) 322 that processes data passing between network services task 324 and an RF interface module 300. In processing the data, RFCL 322 performs multiple tasks including TCP/IP header compression and decompression, IP header compression and decompression, and wireless transmission encryption and decryption of the data.

Data services module 320 exchanges data with data terminal port 218 via a serial interface module 360 and a hardware abstraction layer (HAL) 372. Serial interface module 360 includes a serial input/output receiver module, or task, (Serial I/O RX) 364 and a serial input/output transmitter module, or task, (Serial I/O TX) 365 that each provide buffered input and output for data passing between data terminal port 218 and a data services controller (DSC) 363. Serial I/O RX 364 receives data from data terminal port 218 via a hardware abstraction layer (HAL) 372 and conveys the data to DSC 363. Serial I/O TX 365 receives data from DSC 363 and conveys the data to data terminal port 218 via HAL 372. HAL 372 is an abstraction layer that provides an interface between the electrical circuitry of data terminal port 218 and software included in serial interface module 360.

DSC 363 parses commands 317 received from, and conveyed by software module 210 to, data terminal port 218 and manages the data processing services provided by software module 210 to a unit of received data, such as a data packet. DSC 363 is also in communication with a packet data serial data link 361 that provides parsing and processing for point-to-point protocol (PPP), serial line Internet protocol (SLIP), and compressed serial line Internet protocol (CSLIP) data received from, and conveyed by software module 210 to, data terminal port 218.

Data services module 320 exchanges data with RF transmitter 204 and receiver 206, and thereby with antenna port 220 and antenna 202, via an RF interface module 300 and a HAL 374. Similar to HAL 372, HAL 374 is an abstraction layer that provides an interface between the electrical circuitry of RF transmitter 204 and receiver 206 and the software included in RF interface module 300. RF interface module 300 provides lower layer services to data services module 320, such as a link layer control (LLC) task 302 and a media access control (MAC) task 304. The LLC and MAC tasks 302, 304 include assuring the reliable transmission and reception of protocol data units (PDU's), flow control of the PDU's, fragmentation of PDU's for insertion into data transmission slots, such as time slots in a Time Division Multiple Access (TDMA) system, reassembly of fragmented PDU's into a complete PDU, and the acquisition of a communication channel, such as a time slot, for transmission of the PDU's. Together, the LLC and MAC tasks 302, 304 form a Link Access Protocol (LAP).

Data services module 320 exchanges data with audio input port 214 and audio output port 216 via a radio services module 330, a user interface module 340, and a HAL 370. Radio services module 330 provides basic call handling tasks and resource management tasks to a communication device 112, 114 and controls the flow of voice and data received by the communication device through the device. User interface module 340 facilitates the acquisition of all user input and the display of information necessary to operate a communication device 104,106. HAL 370 is an abstraction layer that provides an interface between the electrical circuitry of ports 214 and 216 and software included in user interface module 340.

Figure 4:
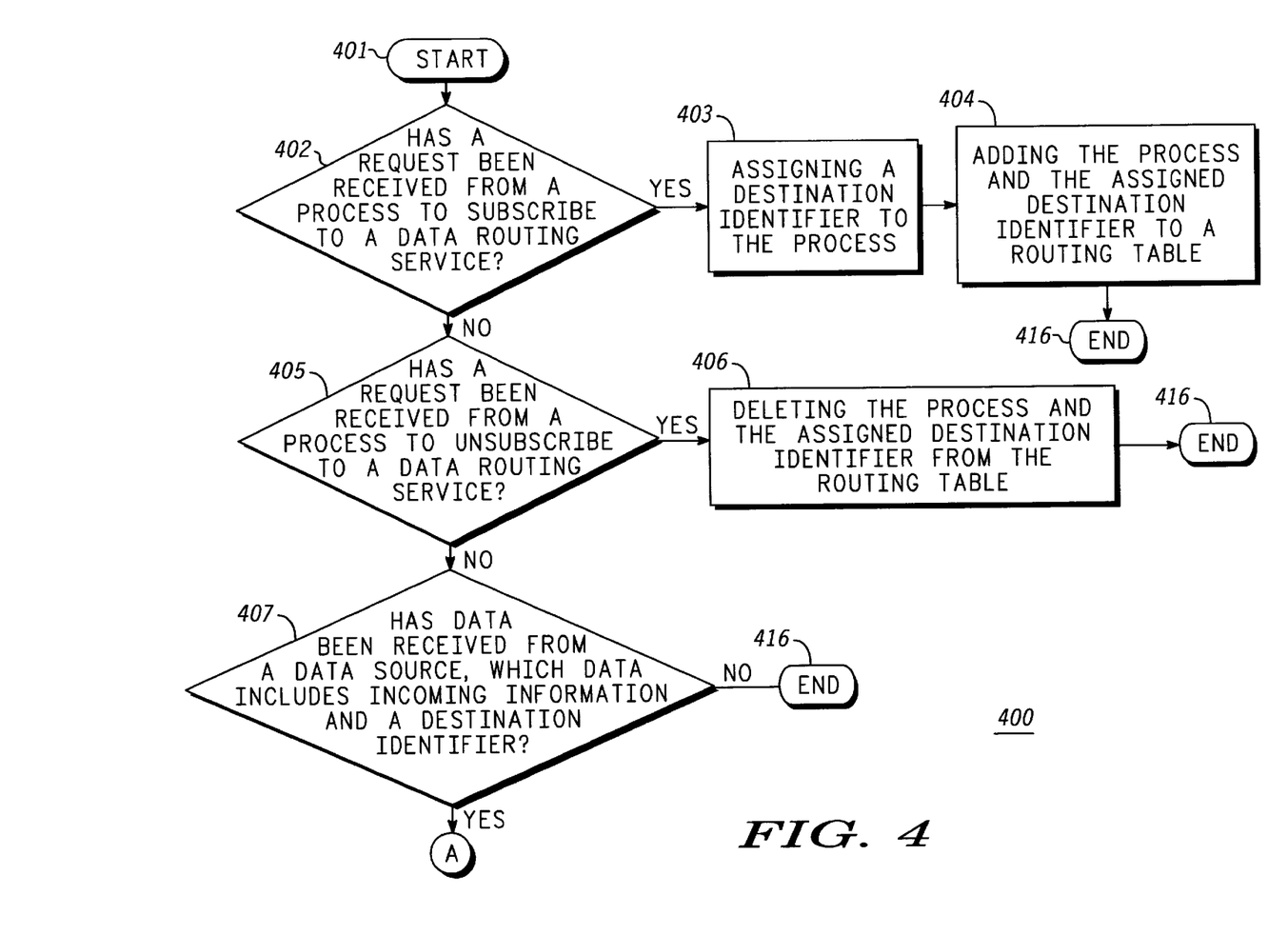
FIGS. 4 and 5 show a logic flow diagram of the steps executed by a communication device of FIG. 2 to provide data routing in accordance with the preferred embodiment of the present invention.
Figure 5:
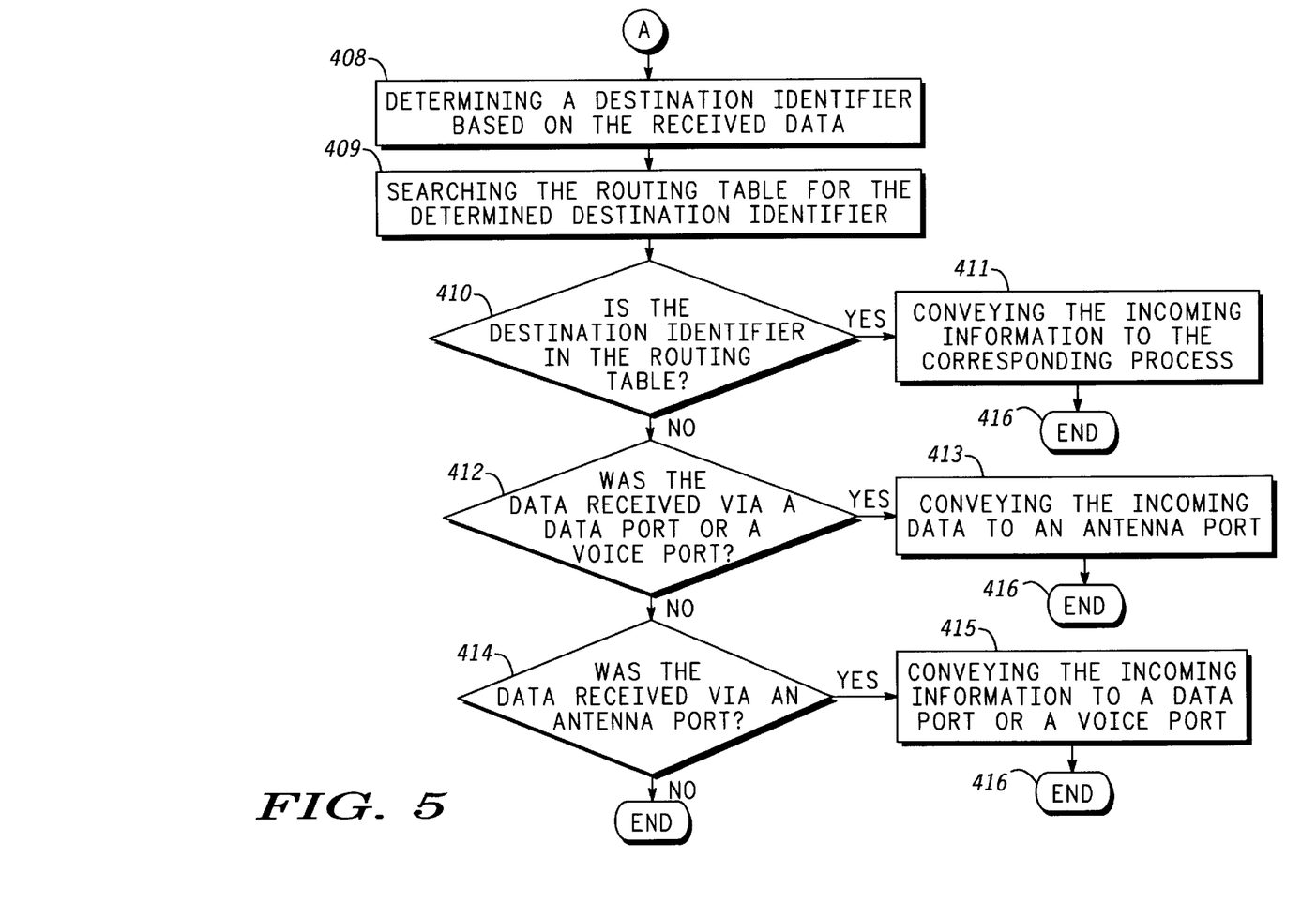

At any one time, one or more software applications that are stored in memory 212 may be running in controller 208 and therefore resident in software module 210. For example and for the purpose of illustrating the principles of the present invention, FIGS. 4 and 5 show a logic flow diagram useful for describing each of two software applications resident in software module 210: a web browser application 350 (FIG. 3), preferably a Wireless Application Protocol (WAP) browser, and an embedded application 310 (FIG. 3), such as a personal information manager (PIM). Web browsers for mobile and portable communication devices, such as the "UNWIRED PLANET" browser software available from Phone.com, Inc. of Redwood City Calif., are well known in the art and will not be detailed herein. Embedded application 310 handles embedded application protocol commands, such as PIM synchronization protocol commands. Embedded application 310 receives PDU's, or fragmented portions of PDU's, from RF receiver 206 via HAL 374, RF interface module 300 and data services module 320, and passes PDU's, or fragmented portions of PDU's, from software module 210 to RF transmitter 204 via data services module 320, RF interface module 300 and HAL 374. Embedded application 310 parses the embedded application protocol commands and forwards received data to one of multiple modules 340, 360 and, via each module 340, 360 and a respective HAL 370, 372, to ports 214–218 of the communication device based on the embedded application protocol.

In the preferred embodiment, web browser 350 communicates with user interface module 340, radio services module 330, and data services module 320, and also with ports 214 and 216 via HAL 370. Similarly, embedded application 310 communicates with user interface module 340, radio services module 330, and also communicates with RF transmitter 204 and receiver 206, and thereby with antenna port 220 and antenna 202, via data services module 320, RF interface module 300 and HAL 374.

In the preferred embodiment, network services task 324 includes a data routing service that routes data received by the software module 210 to the data's intended destination. Preferably, network services task 324 utilizes a UDP protocol to provide the data routing service; however those of ordinary skill in the art will realize that other data transport protocols, such as TCP, may be used without departing from the spirit and scope of the present invention. An application 310, 350 desirous of becoming active subscribes to network services task 324 by conveying a message to data services module 320 that includes a subscription request. In response to the receipt of the subscription request by data services module 320, network services task 324 assigns a destination identifier, preferably a UDP socket, including an IP address and UDP port number, to the subscribing application, binding the assigned socket to the application's assigned port number. In an alternative embodiment of the present invention, the subscribing application may already have an assigned port number, in which event network services task 324 assigns a UDP socket. The UDP port number and IP address (UDP socket) together identify a unique routing destination for the subscribing application. Network services task 324 informs the subscribing application of the socket and adds information concerning the application and corresponding socket to a routing table that is stored in memory 212 or in a buffer in controller 208.

In the preferred embodiment, the assignment by network services task 324 of a UDP socket to a subscribing application is dynamic. That is, an application (e.g., applications 310, 350) subscribes to network services task 324 when the application desires to become active. Network services task 324 assigns a UDP socket to the application and adds the application and socket and port information to the routing table for the duration of the application's operation. When the application's operation ends, the application unsubscribes to the network services task by conveying a deletion request to network services task 324, requesting that network services task 324 delete the application from the routing table. In response to receiving the deletion request, network services task 324 deletes the application and the application's corresponding port and socket information from the routing table, thereby allowing for optimal reuse of port and socket numbers and maximizing the data handling capacity of software module 210.

When data that includes incoming, or user, information, a destination identifier, such as a destination port and destination socket information such as a destination port number and a destination IP address, and a source identifier, such as a source port and source socket information such as a source port number and a source IP address, is received by communication a device 104, 106 via one of ports 214–218 or antenna 202, the data is demodulated and converted to a digital format if it is not already so formatted. The demodulated digital data is then conveyed to software module 210. Network services task 324 parses the received digital data and searches the received digital data for a destination identifier, such as a port number and a destination IP address. Upon identifying a destination identifier, network services task 324 queries memory 212, or the appropriate buffer in controller 208, to determine whether the routing table includes a socket that is bound to the port number identified in the received data (i.e., whether a corresponding IP address and a port number exist in the table). A socket number bound to the port number implies that an application is listening at the port number.

If network services task 324 determines that a socket is bound to the port number and destination IP address, then network services task 324 routes the received incoming information to the destination application based on the socket information in the routing table. If network services task 324 determines that the routing table does not include a socket bound to the port number and IP address, then network services task 324 determines whether the data was received via one of data or voice ports 214–218 or via antenna 202 and antenna port 220 based on the source identifier. When network services task 324 determines that data was received via one of data or voice ports 214–218, then the network services task routes the incoming information to antenna port 220. When network services task 324 determines that the data was received via antenna port 220, then the network services task routes the incoming information to one of data or voice ports 214–218.

As described above, the present invention provides a communication device 104, 106 wherein a data routing service is provided by a network services task 324 in a controller 208. When controller 208 receives data including user information and a destination identifier from a data source via one of multiple ports 214–220, network services task 324 parses the data and determines a destination for the received data by reference to a routing table that is stored in a memory 212 associated with controller 208. Included in the routing table are a listing of all active processes (applications) and a corresponding destination identifier, preferably based on the UDP protocol, for each active process. Network services task 324 determines the destination identifier included in the data, searches the routing table for the determined destination identifier, and upon finding the determined destination identifier in the table, routes the user information to the corresponding process based on the determined destination identifier.

When network services task 324 fails to find the determined destination identifier in the routing table, then network services task 324 determines whether the data was received via one of data or voice ports 214–218 or via antenna 202 and antenna port 220 based on the source identifier. When network services task 324 determines that the data was received via one of data or voice ports 214–218, then the network services task routes the incoming information to antenna port 220. When network services task 324 determines that data was received via antenna port 220, then the network services task routes the incoming information to one of data or voice ports 214–218.

FIGS. 4 and 5 show a logic flow diagram 400 of steps executed by an apparatus that includes a controller and a memory to route data in a communication device 104, 106 in accordance with a preferred embodiment of the present invention. The logic flow begins (401) when a controller in the communication device, preferably a software module in the controller, receives (402) a request from a process to subscribe to a data routing service. The process preferably is a software application, such as a web browser or an embedded application, running on the controller. In response to the request, the controller, preferably the software module, assigns (403) a destination identifier to the process. Preferably, the destination identifier includes port and socket information, such as a port number and an IP address, and is based on a TCP/IP transport layer protocol, such as UDP. The controller, preferably the software module, adds (404) the process and the assigned destination identifier to a routing table and the logic flow ends (416). The routing table is preferably stored in a memory associated with the controller, such as a buffer in the controller or a memory coupled to the controller.

When, instead of receiving a request to subscribe, the controller, preferably the software module, receives (405) a request, from a process to unsubscribe from the data routing service, the software module deletes (406) the application and the application's corresponding port and socket information from the routing table and the logic flow ends (416).

When, instead of receiving a request to subscribe or unsubscribe, the controller receives (407) data from a data source, the controller determines a destination identifier (408) based on the received data. Preferably, the received data includes incoming information and further includes a destination identifier, such as a destination port and destination socket information such as a destination port number and a destination IP address, and a source identifier, such as a source port and source socket information such as a source port number and a source IP address, that is parsed and scanned by the software module of the controller. The controller, preferably the software module, searches (409) the routing table for the determined destination identifier and a corresponding process. When the software module determines (410) that the destination identifier is in the routing table, the software module conveys (411) the user information to the corresponding process by reference to the destination identifier, and the logic flow ends (416).

When the software module fails to find (410) the determined destination identifier in the routing table, the controller, preferably the software module, determines, based on the source identifier, whether the data was received via a data port or a voice port or via an antenna port. When the software module determines (412) that the data was received via the data port or the voice port, the software module conveys (413) the user information to the antenna port and the logic flow ends (416). When the software module determines (414) that the data was received via the antenna port, the software module conveys (415) the incoming information to the data port or the voice port and the logic flow ends (416).

In sum, the present invention provides a method and apparatus for routing data in a communication device 104, 106. The routing service is provided by a network services task 324 in a controller 208 in the communication device, which network services task 324 maintains a routing table of active processes and corresponding destination identifiers. When data that includes user information, a destination identifier, and a source identifier is received by the communication device from a data source, such as a web-based server 116 via the Internet 114 and the fixed communications infrastructure or a DTE 108 coupled to the communication device, network services task 324 parses the data and routes the user information to an active process based on the destination identifier in the data and a corresponding destination identifier in the table. If there is no corresponding destination identifier in the table, then network services task 324 routes the user information to one of multiple communication device ports 214–220 based on the source identifier.

While the present invention has been particularly shown and described with reference to particular embodiments thereof, it will be understood by those skilled in the art that various changes in form and details may be made therein without departing from the spirit and scope of the present invention.

What is claimed is:

1. A method for routing data in a communication device, the communication device comprises a plurality of data ports, wherein the communication device transmits and receives data via a data port of the plurality of data ports, comprising steps of:
   receiving a request from a process to subscribe to a data routing service;
   assigning a destination identifier to the process in response to the request; and
   adding the process and the assigned destination identifier to a routing table, wherein data received from a data source is routed to the process by reference to the destination identifier included in the routing table;
   receiving data from a data source, wherein the data comprises incoming information and a destination identifier;
   determining a destination identifier based on the received data;
   searching the routing table for the determined destination identifier and a corresponding process; and
   when the determined destination identifier is not found in the routing table, conveying the incoming information to a data port of the plurality of data ports.

2. The method of claim 1, wherein the destination identifier comprises a port number.

3. The method of claim 1, wherein the destination identifier comprises a socket number.

4. The method of claim 1, wherein the destination identifier comprises an Internet Protocol (IP) address.

5. The method of claim 1, wherein the destination identifier is based on a User Datagram Protocol (UDP) protocol.

6. The method of claim 1, further comprising steps of:
   receiving data from a data source, wherein the data includes a destination identifier;
   determining a destination identifier based on the received data;
   searching the routing table for the determined destination identifier and a corresponding process;
   when the determined destination identifier is found in the routing table, conveying the data to the corresponding process by reference to the destination identifier.

7. The method of claim 1, further comprising steps of:
   receiving a request from the process to unsubscribe from the data routing service; and
   deleting the process and the assigned destination identifier from the routing table in response to the request to unsubscribe.

8. An apparatus for routing data in a communication device comprising:
   a controller comprising a data routing task that receives a request from a process to subscribe to a data routing service, assigns a destination identifier to the process, and adds the process and the assigned destination identifier to a routing table, wherein data received from a data source is routed to the process by reference to the destination identifier included in the routing table, the controller further receives data from a data source, which data includes incoming information, user information, and a destination identifier, the controller determines a destination identifier based on the received data, searches the routing table for the determined destination identifier and a corresponding process, and, when the determined destination identifier is found in the routing table, conveys user information to the corresponding process by reference to the destination identifier, the controller further conveys the user information to a data port when the determined destination identifier is not found in the routing table; and
   a memory coupled to the controller that stores the routing table.

9. The apparatus of claim 8, wherein the destination identifier is based on a User Datagram Protocol (UDP) protocol.

10. The apparatus of claim 8, wherein the data received from a data source further includes a source identifier, wherein when the determined destination identifier is not found in the routing table the controller further determines a port where the data was received based on the source identifier to produce a receiving port, conveys the incoming information to an antenna port when the determined receiving port is a voice port or data port, and conveys the incoming information to the voice port of the data port when the determined receiving port is the antenna port.

11. The apparatus of claim 8, wherein the controller further receives a request from the process to unsubscribe from the data routing service and deletes the process and the assigned destination identifier from the routing table in response to the request to unsubscribe.

12. A communication device comprising:

a plurality of ports for the transmission and reception of information exchange by the communication device;

a controller in communication with each port of the plurality of data ports, wherein the controller comprises a data routing task that receives a request from a process to subscribe to a data routing service, assigns a destination identifier to the process, adds the process and the assigned destination identifier to a routing table, and routes data received from a data source via a port of the plurality of ports to the process by reference to the destination identifier included in the routing table, the controller further receives data from a data source via a port of the plurality of ports, which data comprises incoming information and a destination identifier, determines a destination identifier based on the received data, searches the routing table for the determined destination identifier and a corresponding process, and, when the determined destination identifier is found in the routing table, conveys the user information to the corresponding process by reference to the destination identifier, the controller further receives the data from the data source via a first port of the plurality of ports, and wherein the controller further conveys the user information to a second port of the plurality of ports when the determined destination identifier is not found in the routing table; and a memory coupled to the controller that stores the routing table.

13. The communication device of claim 12, wherein the controller receives the data from the data source via a receiving port of the plurality of data ports, wherein the data further comprises a source identifier, wherein when the determined destination identifier is not found in the routing table the controller further determines a data source for the received data based on the source identifier, conveys the incoming information to an antenna port when the receiving port is determined to be a voice port or a data port, and conveys the incoming information to the voice port or the data port when the receiving port is determined to be the antenna port.

14. The communication device of claim 12, wherein the controller further receives a request from the process to unsubscribe from the data routing service and deletes the process and the assigned destination identifier from the routing table in response to the request to unsubscribe.

15. A method for routing data in a communication device, the communication device having a plurality of ports, the plurality of ports includes a voice port or a data port and further includes an antenna port, the method comprising steps of:

receiving a request from a process to subscribe to a data routing service;

assigning a destination identifier to the process in response to the request; and adding the process and the assigned destination identifier to a routing table, wherein data received from a data source is routed to the process by reference to the destination identifier included in the routing table;

receiving data from a data source, wherein the data includes a destination identifier and a source identifier;

determining a destination identifier based on the received data;

searching the routing table for the determined destination identifier and a corresponding process;

when the determined destination identifier is not found in the routing table, determining a port where the data was received based on the source identifier;

when the determined port is the voice port or the data port, conveying the user information to the antenna port; and when the determined port is the antenna port, conveying the data to the voice port or the data port.

16. The method of claim 15, wherein the destination identifier comprises a port number.

17. The method of claim 15, wherein the destination identifier comprises a socket number.

18. The method of claim 15, wherein the destination identifier comprises an Internet Protocol (IP) address.

19. The method of claim 15, wherein the destination identifier is based on a User Datagram Protocol (UDP) protocol.

20. The method of claim 15, further comprising steps of:

receiving data from a data source, wherein the data includes a destination identifier;

determining a destination identifier based on the received data;

searching the routing table for the determined destination identifier and a of corresponding process;

when the determined destination identifier is found in the routing table, conveying the data to the corresponding process by reference to the destination identifier.

21. The method of claim 15, further comprising steps of:

receiving a request from the process to unsubscribe from the data routing service; and deleting the process and the assigned destination identifier from the routing table in response to the request to unsubscribe.

* * * * *